US012761954B2

(12) United States Patent
Jayawardane et al.

(10) Patent No.: US 12,761,954 B2
(45) Date of Patent: Oct. 13, 2026

(54) DETERMINISM AND REPRODUCIBILITY OF DATA FLOW

(71) Applicant: NVIDIA Corporation, Santa Clara, CA (US)

(72) Inventors: Akila Damsara Jayawardane, Sunnyvale, CA (US); Aly Hirani, San Jose, CA (US); Sachit Kadle, Milpitas, CA (US); Christopher Dannemiller, Gilbert, AZ (US)

(73) Assignee: NVIDIA Corporation, Santa Clara, CA (US)

( * ) Notice: Subject to any disclaimer, the term of this patent is extended or adjusted under 35 U.S.C. 154(b) by 371 days.

(21) Appl. No.: 18/541,896

(22) Filed: Dec. 15, 2023

(65) Prior Publication Data

US 2025/0199853 A1 Jun. 19, 2025

(51) Int. Cl.
*G06F 9/48* (2006.01)

(52) U.S. Cl.
CPC .................................. *G06F 9/4887* (2013.01)

(58) Field of Classification Search
CPC ..................................................... G06F 9/4887
See application file for complete search history.

(56) References Cited

U.S. PATENT DOCUMENTS 10,152,243 B2 * 12/2018 Zhao .................... G06F 3/0613

FOREIGN PATENT DOCUMENTS

EP 0403229 * 12/1990 .............. G06F 9/46

* cited by examiner

*Primary Examiner* — Wissam Rashid

(57) ABSTRACT

The present disclosure relates to executing a first task of an application over one or more first execution iterations to generate one or more first data iterations of first data. At least one individual first timestamp may respectively correspond to at least one first data iterations of the one or more first data iterations. A second task may be executed to generate one or more second data iterations based at least on the at least one first data iteration, the second task obtaining the at least one individual first timestamp corresponding to the at least one first data iteration. In some embodiments, the at least one first data iteration for use may be selected based at least on the corresponding at least one first timestamp.

20 Claims, 13 Drawing Sheets

DETERMINISM AND REPRODUCIBILITY OF DATA FLOW

BACKGROUND

In some instances, a system may be configured to execute multiple corresponding to one or more operations using certain data associated with the system. For instance, the system may execute the multiple tasks using one or more computing applications (e.g., software applications) executed by one or more computing platforms. The multiple tasks may have certain relationships among the tasks, such as interdependent or sequential relationships.

In some instances, the multiple tasks and the relationship therebetween may be illustrated using a data flow. For example, the data flow may illustrate movement of the data from one component to another within the system. The tasks may be executed to process, transform, and/or transfer the data.

Some approaches to executing the multiple tasks illustrated by the data flow may include parallel execution of the tasks. For example, the tasks and/or threads (e.g., groups of one or more tasks) may be executed in parallel—such as by processing, reading, and writing to a global memory at least partially concurrently. In some instances, the parallel execution may help process all available inputs as fast as possible, reduce latency, and use all available resources. For instance, the global memory may be used to manage the data shared among the tasks to allow the tasks to operate independently by obtaining data from the global memory for processing as soon as the data becomes available (e.g., written to the global memory by another process). However, such an approach may introduce non-determinism in the system, where running a same application multiple times may produce slightly different results based on random execution order of tasks at runtime. Furthermore, such an approach may cause the application to be non-reproducible, as the application may not produce same results when repeated due to loss of intrinsic information about which variable state was seen by various tasks.

SUMMARY

According to one or more embodiments of the present disclosure, a first task of an application may be executed over one or more first execution iterations to generate one or more first data iterations of first data. At least one individual first timestamp may respectively correspond to at least one first data iteration of the one or more first data iterations. In some embodiments, a second task may be executed to generate one or more second data iterations based at least on the at least one first data iteration, the second task obtaining the at least one individual first timestamp corresponding to the at least one first data iteration. In some embodiments, the at least one first data iteration for use may be selected based at least on the corresponding at least one first timestamp.

The embodiments of the present disclosure may help execute multiple tasks concurrently in a deterministic and/or reproducible manner. For example, a concept of sharded simulation time may be implemented during execution of the tasks. For instance, the tasks may be executed sequentially according to discrete time intervals. One or more tasks may be associated with different time intervals that may be executed concurrently. In some instances where a subsequent task is configured to obtain data from an upstream task, the subsequent task may be configured to keep track of completion times of the upstream task to adjust corresponding time intervals.

Some traditional approaches to executing multiple tasks concurrently may include executing the tasks independently by allocating and managing the tasks and computing resources within a data flow of the application while the application is running and/or being executed, which may introduce randomness to the data flow. The embodiments of the present disclosure may help reduce the randomness in concurrent execution of the tasks within the application. For example, one or more embodiments of the present disclosure may be such that the tasks are configured to be executed at certain time intervals, and in response to delays and/or changes to actual execution times with an upstream task, a subsequent task may modify corresponding time intervals and/or stall execution to compensate for the delay.

BRIEF DESCRIPTION OF THE DRAWINGS

The present systems and methods for implementing deterministic and reproducible data flows are described in detail below with reference to the attached figured, wherein.

DETAILED DESCRIPTION

Figure 1:
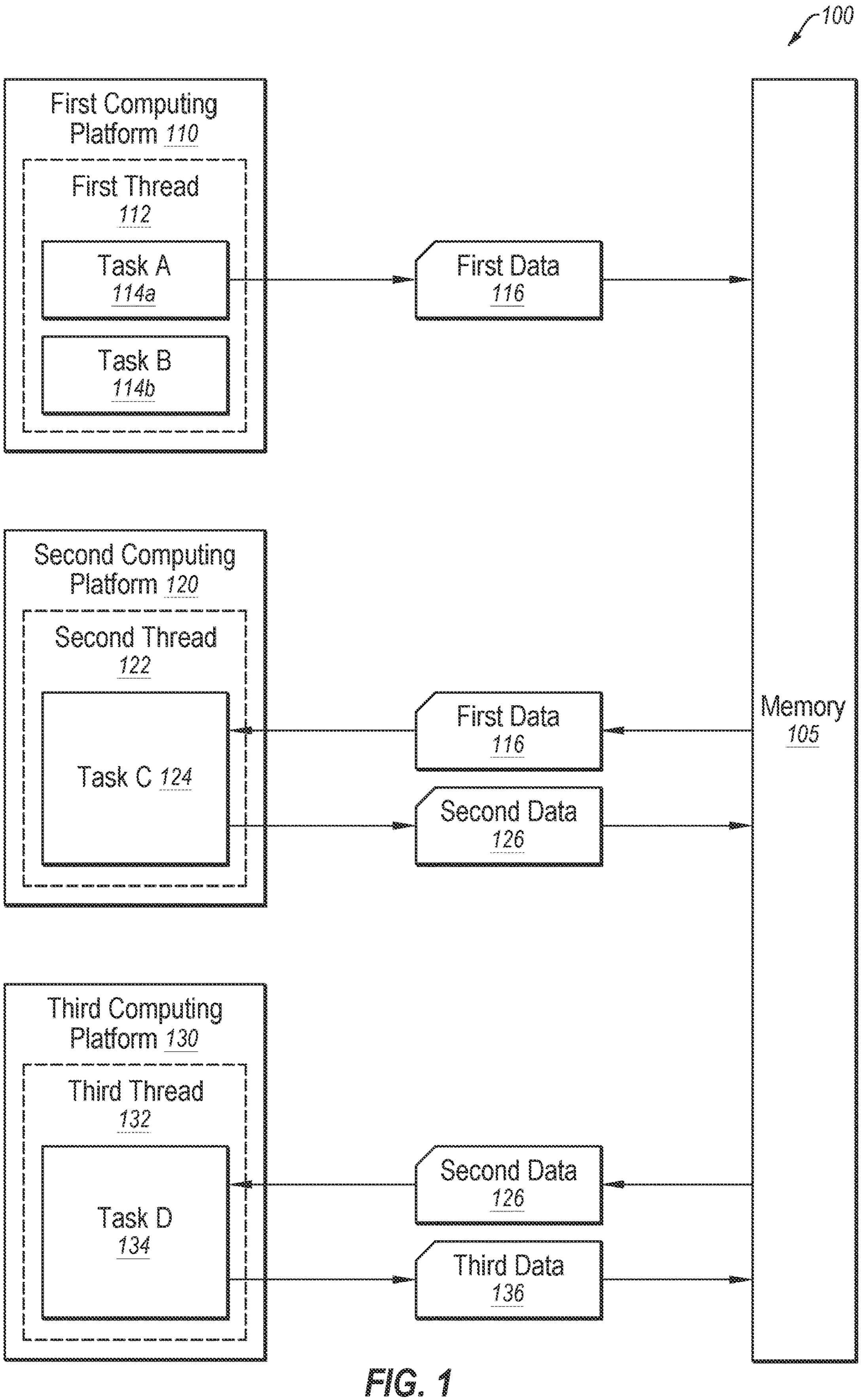
FIG. 1 illustrates an example system configured to execute tasks, in accordance with one or more embodiments of the present disclosure.

One or more embodiments of the present disclosure may relate to improving determinism and reproducibility of a data flow. In some embodiments, the data flow may include multiple tasks and/or threads. The tasks may be interrelated and/or interdependent such that data flows and/or transfers from one task to one or more other tasks. For example, a first task may be configured to generate first data by performing one or more operations. A second task may be configured to generate second data by further processing the first data. For instance, a computing platform executing the second task may obtain the first data generated through the first task to generate the second data.

In some embodiments, the tasks of the data flow may be operated with sharded simulation times. For instance, a simulation of the tasks may be divided into discrete time intervals or shards. The shards may represent small units of simulation time, and the simulation may execute the shards sequentially. During a period of a particular shard, corresponding iterations of the tasks may be executed. In some instances, the corresponding iterations of the tasks may be delayed or not complete within the particular shard. In such instances, the corresponding iterations of the tasks and/or subsequent iterations of the tasks may be adjusted to compensate for the delay.

In some embodiments, the tasks and/or threads of the tasks may have corresponding times and/or clocks that may determine timings to execute the tasks and/or the threads. For example, the first task and the second task may be executed independently based at least on a first time associated with the first task and a second time associated with the second task. In some embodiments, the iterations of the first task and/or the iterations of the second task may be adjusted to compensate for the delays based at least on the first time and the second time.

In some embodiments, the first task and the second task may be executed concurrently. For instance, the first task and the second task may begin executing at the same time. In some instances, the first task and the second task may be iterated and/or repeated to generate multiple data iterations of the first data and the second data, respectively. For instance, the system may obtain and/or generate a new set of data on which to perform the first task. For example, a machine corresponding to the system may be moving and/or operating and obtaining new data as the machine is moving and/or operating. The system may execute the first task over multiple execution iterations to process the newly obtained data. In some instances, the system may iterate the first task to improve previously processed data. In another instance, the first task may be repeated using the same data.

In some embodiments, the one or more data iterations of the tasks may be timestamped with the corresponding times by the corresponding clocks. The computing platforms and/or the computing applications executing subsequent tasks may obtain the data iterations with the timestamps and determine which of the data iterations to obtain and process for subsequent iterations of the subsequent tasks. In some instances, a ratio between the first data iterations and the second data iterations may be 1:1. For instance, a single second data iteration may be generated using a single first data iteration. In some instances, the ratio may not be 1:1. For instance, the single second data iteration may be generated based on multiple first data iterations. For example, the system may execute the second task once for every two execution iterations of the first task. The ratio between the first data iterations and the second data iterations may include any suitable ratio. One or more execution iterations of the second task may not be properly executed in instances in which the second task may not have obtained associated first data from the first task, as the first task and the second task are being executed concurrently.

In some embodiments, the system may be configured to execute the second task at different times based on the timestamps associated with the first data iterations to execute the iterations of the second task after obtaining expected data iterations of the first task. For example, the iterations of the second task may be stalled and/or paused to wait for the certain iterations of the first task to complete.

One or more embodiments of the present disclosure may help improve determinism and reproducibility of data flow over some traditional approaches to concurrent application of multiple tasks. For example, some traditional approaches may include runtime mapping. For instance, the runtime mapping may include assigning the tasks to available computing resources and/or threads based on factors such as workload, system resources, task priorities, among others. At each predefined time interval, the computing platforms corresponding to the tasks may read, from the global memory, data to be processed, process the data, and write the processed data to the global memory. Such parallel execution of the tasks may help process all available inputs as fast as possible, reduce latency, and use all available resources. For instance, the global memory may be used to manage the data shared among the tasks to allow the tasks to operate independently by obtaining data from the global memory for processing as soon as the data becomes available (e.g., written to the global memory by another process).

However, such an approach may cause the application to be non-deterministic. For instance, running the application multiple times may produce slightly different results based on random execution order of the threads at runtime. Additionally or alternatively, such an approach may cause the application to be non-reproducible. For instance, results from the application and/or the data flow may not be consistent or replicable across different executions or in different execution environments. In some instances, lack of ability to be deterministic and/or reproducible may pose multiple practical challenges due to randomness of the application's behavior. For example, the application may not be executed in test harnesses against golden datasets (e.g., high-quality, well-curated datasets that may be used as a standard which other datasets or other models are evaluated) due to randomness. Further, developers may not be able to do iterative development as impact of changes made may not be quantified due to the randomness. Furthermore, issues seen in prior application runs may not be effectively debugged as the application may not tested in a precisely same manner to locate and/or address the issues. Finally, any change in underlying platform (e.g., number of CPUs, CPU cores, GPUs, CUDA cores available) may have a potential to drastically change the application output.

One or more of the embodiments disclosed herein may relate to executing tasks of a data flow and/or an application in a deterministic and/or reproducible manner with respect to ego-machines and/or components of the one or more ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous vehicle or machine 500 (alternatively referred to herein as "vehicle 500" or "ego-machine 500") described with respect to FIGS. 5A-5D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, generative AI, data center processing, conversational AI (such as by employing one or more language models such as one or more large language models (LLMs)), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations (e.g., systems that implement one or more language models, such as large language models (LLMs)), systems for performing one or more generative AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

The embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

With respect to FIG. 1, FIG. 1 illustrates an example system 100 configured to execute tasks, in accordance with one or more embodiments of the present disclosure. In some embodiments, the system 100 may include a memory 105. The memory 105 may be configured to store data generated by executing one or more tasks. Additionally or alternatively, the one or more tasks may be executed using data stored in the memory 105.

In some embodiments, the system 100 may include one or more computing platforms configured to read and write to the memory 105. For example, the system 100 may include a first computing platform 110, a second computing platform 120, and a third computing platform 130 (collectively referred to as "the computing platforms"). In these and other embodiments, the computing platforms may include any hardware and/or software environments that may execute applications and/or tasks. For example, the computing platforms may include a central processing unit (CPU), a graphics processing unit (GPU), field-programmable gate array (FPGA), application-specific integrated circuit (ASIC), microcontrollers, digital signal processor (DSP), among others. Additionally, in some embodiments, the computing platforms may include individual processing cores within the processors. For example, the computing platforms may refer to individual cores within the CPU. In such instances, a first core within the CPU and a second core within the same CPU may be referred to as separate computing platforms.

In these and other embodiments, the computing platforms may be configured to execute one or more tasks. A task may refer to a set of operations and/or actions that may be performed on data as the data moves through the system 100. The one or more tasks may be configured to process, transform, and/or analyze the data to achieve a specific outcome and/or a goal. For example, the one or more tasks may include data ingestion, data extraction, data transformation, data enrichment, data filtering, data storage, data integration, data exporting, data cleaning, among others. In some instances, the tasks may vary based on a type of system executing the tasks.

In some embodiments, a group of one or more tasks configured to be executed by a same computing platform may be referred to as a thread. For instance, the first computing platform 110 may be configured to execute a first thread 112. In some embodiments, the first thread 112 may include a Task A **114*a* and a Task B 114*b*. The second computing platform 120 may be configured execute a second thread 122 including a Task C 124, and the third computing platform 130 may be configured to execute a third thread 132 including a Task D 134**. In the present disclosure, reference to a task performing operations (e.g., obtaining, executing, etc.) may include a corresponding computing platform performing the operations.

In some embodiments, the one or more tasks may be executed using one or more corresponding computing platforms. For example, different computing platforms may be configured to execute corresponding tasks. In some embodiments, the computing platforms may be configured execute the corresponding tasks and/or threads in a serial manner with respect to other computing platforms. For instance, the tasks may be executed in a predetermined order (e.g., a task starts executing after previous task completes). Additionally or alternatively, in some embodiments, the one or more tasks and/or threads may be executed in a parallel manner. For example, the computing platforms may execute associated tasks and/or threads in parallel (e.g., executed concurrently). In some embodiments, a single task may be capable of being performed on only one type of processing device (e.g., a CPU, a GPU, an accelerator, etc.), while other tasks may be capable of being performed by two or more processing devices, thus making those tasks more adaptable to their location within a data flow.

In some embodiments, the one or more tasks being executed on the system 100 may be related. For instance, a certain task may be configured to obtain and further process data generated by another task. For example, the Task A **114*a* may be configured to generate a first data 116, which may be written to the memory 105. The Task C 124 may be configured to perform additional operations on the first data 116 to determine a second data 126. For instance, the second computing platform 120 may read the first data 116 from the memory 105 to execute the Task C to generate the second data 126, which may be written to the memory 105. Additionally, the Task D 134 may be configured to obtain and process the second data 126 to generate a third data 136. Additionally or alternatively, the Task A 114***a* may obtain the second data 126 generated by the Task C 124, and the Task C 124 may obtain the third data 136 generated by the Task D 134.

Additionally or alternatively, the computing platforms may be configured to communicate via buses. For instance, one or more data buses may connect the computing platforms such that the data may be transferred between the computing platforms. The one or more buses may include any types of suitable buses such as a memory bus, a serial ATA (SATA), a universal serial bus (USB), an accelerated graphics port (AGP), a peripheral component interconnect (PCI) bus, a front side bus (FSB), a system bus, among others.

In some embodiments, one or more of the tasks may be iterated and/or repeated for one or more execution iterations to generate one or more data iterations. For example, the Task A 114*a* may be iterated for one or more execution iterations to generate one or more data iterations of the first data 116. In some embodiments, the tasks may be iterated using the same data over the one or more execution iterations. For instance, a first execution iteration and a second execution iteration of the Task A 114*a* may be executed using the same data.

Additionally or alternatively, one or more of the tasks may be iterated using newly obtained data. For example, individual execution iterations may process different data. For instance, different data may be obtained by the system 100. For example, in some embodiments, the system 100 may include an autonomous vehicle. In these instances, the system 100 may obtain new data as the system 100 is traveling. For instance, the system 100 may obtain sensor data representing surroundings of the system 100 using one or more sensors. The one or more tasks may be configured to obtain and process the sensor data as the system 100 is traveling. For instance, the Task A 114*a* may be configured to obtain and process the sensor data. For example, the first execution iteration of the Task A 114*a* may be executed to process the sensor data corresponding to a first location, and the second execution iteration of the Task A 114*a* may be executed to process the sensor data corresponding to a second location.

In these and other embodiments, one or more of the tasks may be iterated using previously determined data. For instance, a first data iteration of the first data 116 generated over the first execution period of the Task A 114*a* may be further processed over a second execution iteration of the Task A 114*a* to generate a second data iteration of the first data 116.

In some embodiments, the execution iterations of the tasks may be executed based at least on different execution periods and execution times. For instance, the execution periods may define how often the execution iterations may repeat. For instance, the execution iterations may start executing every execution period. In these and other embodiments, the execution times may define how long individual execution iterations are expected to take to execute.

In some embodiments, the tasks may be related such that a certain task may be configured to execute one or more corresponding execution iterations using one or more data iterations from another task. For example, the Task C 124 may be configured obtain one or more data iterations of the first data 116 to execute one or more execution iterations of the Task C 124, instead of obtaining the entire first data 116. For instance, the first data 116 may include multiple iterations generated over one or more execution iterations of the Task A 114*a*. The Task C 124 may obtain certain number of iterations of the multiple iterations, rather than waiting for and/or obtaining every iteration of the first data 116. As another example, the Task D 134 may obtain one or more data iterations of the second data 126 to execute the one or more execution iterations of the Task D 134. In some instances, a ratio between the data iterations of the Task C 124 and the data iterations of the Task D 134 may be 1:1. For instance, a single data iteration of the Task D 134 may be generated using a single data iteration of the Task C 124. In some instances, the ratio may not be 1:1. For instance, the single data iteration of the Task D 134 may be generated based on multiple data iterations of the Task C 124. For example, the system may execute the Task D 134 once for every two execution iterations of the Task C 124. The ratio between the data iterations of the Task C 124 and the data iterations of the Task D 134 may include any suitable ratio.

In some embodiments, the data iterations of the tasks may have corresponding timestamps. In these and other embodiments, the timestamps may represent completion times associated with the data iterations. For instance, the timestamps may represent when the execution iterations completed executing to generate corresponding data iterations. Additionally or alternatively, the timestamps may include corresponding expected completion times of one or more next execution iterations. For example, timestamps corresponding to a first execution iteration of the Task A 114*a* may include a completion time of the first execution iteration and an expected completion time of a second execution iteration of the Task A 114*a*. In some embodiments, the first execution iteration of the Task A 114*a* may include separate timestamps corresponding to the completion time of the first execution iteration and the expected completion time of the second execution iteration of the Task A 114*a*. Additionally or alternatively, the first execution iteration of the Task A 114*a* may have one corresponding timestamp that may include multiple parts corresponding to the completion time of the first execution iteration and the expected completion time of the second execution iteration of the Task A 114*a*. In any embodiments, the expected completion time may include the actual expected completion time plus a buffer of time to account for any delays or complexities in the processing of any particular iteration.

Additionally or alternatively, the timestamps may include one or more start times of one or more of the tasks. For instance, the timestamp corresponding to the first execution iteration of the Task A 114*a* may include a first start time of the first execution iteration of the Task A 114*a*. In some instances, the first start time may include an expected start time or an actual start time of the first execution iteration of the Task A 114*a*. In such instances, the expected completion time may be inferred based at least on the first start time and the first execution time (e.g., add the first execution time to the first start time). For instance, the first execution iteration of the Task A 114*a* may be expected to being executing at the first start time and complete executing after the first execution time. For example, the first start time may be 2 ms and the first execution time may be 2 ms. In such instances, the Task C 124, configured to obtain one or more data iterations of the Task A 114, may determine that the first execution iteration of the Task A 114 is expected to complete by 4 ms based at least on the first start time and the first execution time.

In some embodiments, the timestamps for different tasks may be measured and/or generated using different clocks corresponding to the tasks. For example, a first clock may be associated with the first thread 112, a second clock may be associated with the second thread 122, and a third clock may be associated with the third thread 132. In some embodiments, the first clock, the second clock, and the third clock may operate independently, such that one does not affect another. In these and other embodiments, the clocks may be configured such that the clocks operate independently from real time. For instance, the clocks may not necessarily be synched with real time.

In some embodiments, the Task C 124, which may be configured to obtain the data iterations of the Task A 114*a*, may determine which and/or how many data iterations of the Task A 114*a* to obtain based at least on the timestamps. For instance, the Task C 124 may obtain the data iterations of the Task A 114*a* with completion times equal to and/or prior to start time of execution iterations of the Task C 124. For example, a second execution iteration of the Task C 124 may be configured to begin executing at 2 ms, therefore obtaining and processing the first data iteration of the Task A 114*a* which may complete by time 2 ms.

Figure 2A:
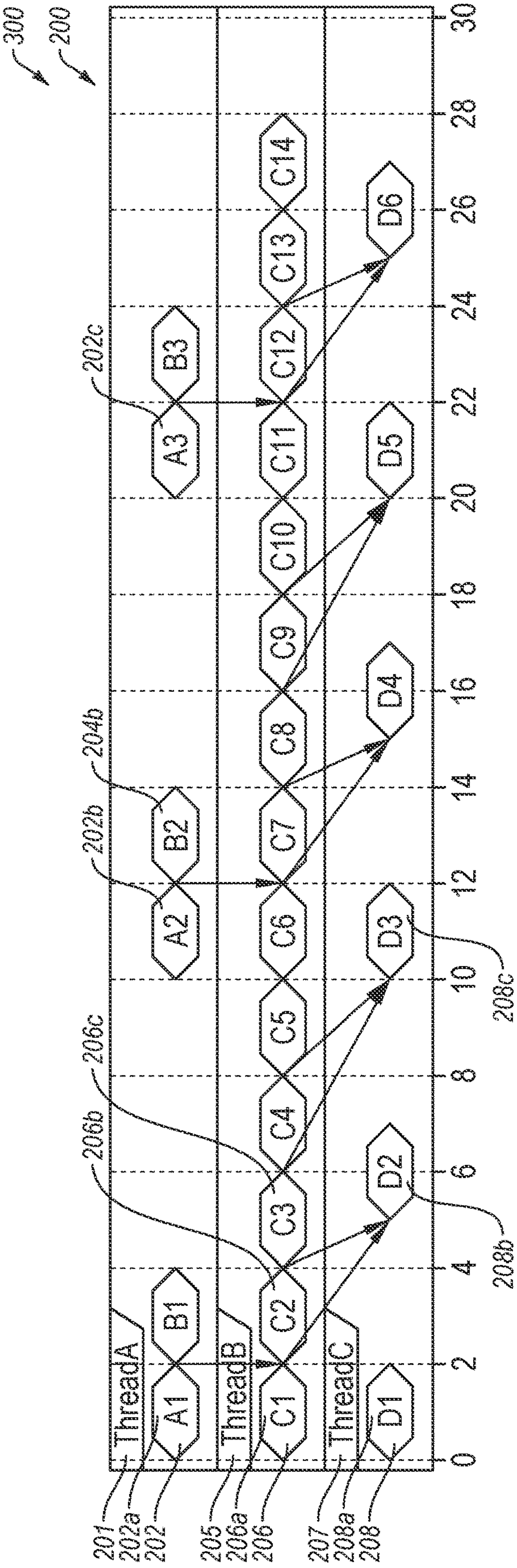
FIGS. 2A-2E illustrate example data flows of executing multiple tasks.

For example, FIG. 2A illustrates an example data flow 200 illustrating a data flow of a Thread A 201, a Thread B 205, and a Thread C 207. In some embodiments, the Thread A 201 may include a Task A 202 and a Task B 204. The Thread B 205 may include a Task C 206, and the Thread C 207 may include a Task D 208. In some embodiments, the Threads may be executed by different computing platforms. For example, the Thread A 201 may be executed using a first computing platform (e.g., such as the first computing platform 110 of FIG. 1), the Thread B 205 may be executed using a second computing platform (e.g., such as the second computing platform 120 of FIG. 1), and the Thread C 207 may be executed using a third computing platform (e.g., such as the third computing platform 130 of FIG. 1). In these and other embodiments, the Threads may be executed using a same computing platform. For example, the first computing platform executing the Thread A 201 may be the same computing platform as the second computing platform executing the Thread B 205.

In some embodiments, different tasks may be iterated for one or more execution iterations. For example, the Task A 202 may include a first iteration 202*a*, a second execution iteration 202*b*, and a third execution iteration 202*c*. In some embodiments, the Task A 202 may be iterated based at least on a first execution period. For example, the first computing platform may start executing the Task A 202 based at least on the first execution period. For instance, the first execution period may be 10 ms, with the first execution iteration 202*a* starting at 0 ms, the second execution iteration 202*b* starting at 10 ms and the third execution iteration 202*c* starting at 20 ms.

In these and other embodiments, the Task A 202 may have a first execution time associated with the Task A 202. For instance, individual execution iterations of the Task A 202 may take the first execution time to finish executing. For example, the first execution time may be 2 ms, an individual execution iteration being expected to take 2 ms to complete. For example, the first execution iteration 202*a* may start at 0 ms and complete at 2 ms, and the second execution iteration 202*b* may start at 10 ms and complete at 12 ms. In these and other embodiments, the execution iterations of the Task A 202 may generate one or more data iterations corresponding to the execution iterations of the Task A 202.

In some embodiments, one or more tasks within a same thread may be executed in series. For example, one or more execution iterations of the Task B 204 may be executed using one or more first data iterations of the Task A 202. For instance, the first computing platform may execute the execution iterations of the Task A 202 and the execution iterations of the Task B 204 in series. For example, individual execution iterations of the Task A 202 may be followed by individual execution iterations of the Task B 204.

In some embodiments, the Task C 206 may be configured to obtain the first data generated by the Task A 202. For example, certain execution iterations of the Task C 206 may be executed using one or more data iterations of the Task A 202. In some embodiments, relationships (e.g., which execution iteration of the Task C 206 uses which execution iteration of the Task A 202) may be determined based at least on different times associated with the Task A 202 and the Task C 206. For instance, timestamps corresponding to the data iterations of the Task A 202 may include completion times representing when the data iterations of the Task A 202 completed. For example, the first data iteration generated form the first execution iteration 202*a* of the Task A 202 may have corresponding timestamps including when the first execution iteration 202*a* completed (e.g., 2 ms). In some embodiments, the timestamps corresponding to the Task A 202 may be determined and/or generated using a first clock associated with the Task A 202 and/or the Thread A 201.

In these and other embodiments, the second computing platform may execute the execution iterations of the Task C 206 after obtaining one or more data iterations of the Task A 202 that have completed executing prior to or by the time the execution iterations of the Task C 206 start. Additionally or alternatively, the execution iterations of the Task C 206 may obtain the data iterations of the Task A 202 that have not been obtained and/or processed using the Task C 206 previously.

Additionally or alternatively, the timestamps corresponding to the data iterations of the Task A 202 may include an expected completion time of an upcoming execution iteration of the Task A 202. For example, the timestamp corresponding to the first execution iteration 202*a* may include an expected completion time of the second execution iteration 202*b* of the Task A 202*a* (e.g., 12 ms). In these and other embodiments, the Task C 206 may determine which data iterations of the Task A 202 to obtain for further processing. For example, the Task C 206 may obtain the first data iteration of the Task A 202 and the corresponding timestamp at time 2 ms. The corresponding timestamp may include a completion time of the first execution iteration 202*a* of the Task A 202 (e.g., 2 ms) and an expected completion time of the second execution iteration 202*b* of the Task A 202 (e.g., 12 ms).

In these instances, the second computing platform may execute the second execution iteration 206*b* of the Task C 206 after obtaining the first data iteration of the Task A 202 at 2 ms. Additionally, one or more iterations of the Task C 206 may be executed without waiting for and/or obtaining further data iterations of the Task A 202 until expected completion time of the second execution iteration 202*b* of the Task A 202 at 12 ms.

In some embodiments, the third computing platform may execute the Task D 208 based at least on a third execution period and a third execution time. For instance, the Task D 208 may be executed every third execution period and individual execution iteration may be processed over the third execution time. For example, the third execution period may be 5 ms and the third execution time may be 2 ms. For instance, a first execution iteration 208*a* of the Task D 208 may start at 0 ms and complete by 2 ms. A second execution iteration 208*b* of the Task D 208 may start at 5 ms and complete by 7 ms.

In some embodiments, the one or more execution iterations of the Task D 208 may be executed using one or more data iterations of the Task C 206. In some embodiments, the Task D 208 may determine which and/or how many of the data iterations of the Task C 206 based at least on second timestamps corresponding to the one or more execution iterations of the Task C 206. For instance, the Task D 208 may obtain and/or process the data iterations of the Task C with completion times at or prior to a starting time of an iteration of the Task D 208. For example, a timestamp corresponding to the first execution iteration 206*a* of the Task C 206 may indicate that the first execution iteration 206*a* completed at 2 ms, and a timestamp corresponding to the second execution iteration 206*b* of the Task C 206 may indicate that the second execution iteration 206*b* completed at 4 ms. In these instances, the second execution iteration 208*b* of the Task D 208 which may be configured to start at 5 ms may obtain and/or process a first data iteration and a second data iteration of the Task C 206.

Returning to FIG. 1, in some embodiments, individual execution iterations may take shorter or longer compared to expected execution times. For instance, various factors involving hardware and/or software may cause the actual execution time to vary. For example, the execution time of the one or more first execution iterations may vary due to data volume (e.g., large amount of data may cause delays), an inefficient algorithm associated with the first task (e.g., inefficient algorithms or data processing methods), limited hardware resources (e.g., insufficient processing power, memory and/or storage), network latency (e.g., network latency, packet loss, and/or limited bandwidth), concurrency and locking (e.g., contention for resources and improper concurrency control), software bugs (e.g., bugs and/or issues with data processing software), external dependencies (e.g., when tasks depend on external services or resources that may be slow), among others.

With respect to some traditional approaches to multiple task executions, such delays and/or varying actual execution times may cause randomness and corresponding issues to the data flow. For example, the varying actual execution times of a first task may cause a second task (that is configured to obtain data iterations of the first task) to not obtain certain data iterations that the second task should be at certain execution iterations. For example, a first execution iteration of the first task may be configured to start at 0 ms and end (complete) at 2 ms. A second execution iteration of the second task may be configured to iterate every 2 ms with a second execution time of 2 ms. The second execution iteration of the second task may be configured to start at 2 ms and end at 4 ms. In these instances, the second execution iteration of the second task may be configured to obtain a first data iteration of the first task to execute the second execution iteration of the second task as end time of the first execution iteration of the first task (e.g., 2 ms) is equal to or less than starting time of the second execution iteration of the second task (e.g., 2 ms). However, in some instances, the first execution iteration of the first task may be delayed. For example, the first execution iteration of the first task may complete by 3 ms instead of 2 ms due to a delay.

In some instances, the second execution iteration of the second task may be executed without obtaining the first data iteration of the first task. In such instances, such variance may add randomness to the data flow. For instance, different runs or executions of the tasks may lead to different results as different execution iterations may be executed based on different data. Such randomness may cause the tasks to be non-deterministic (e.g., running the same tasks using the same data may not generate same results) and/or non-reproducible (e.g., particular run of the tasks may not be reproduced and/or replicated).

Figure 2B:
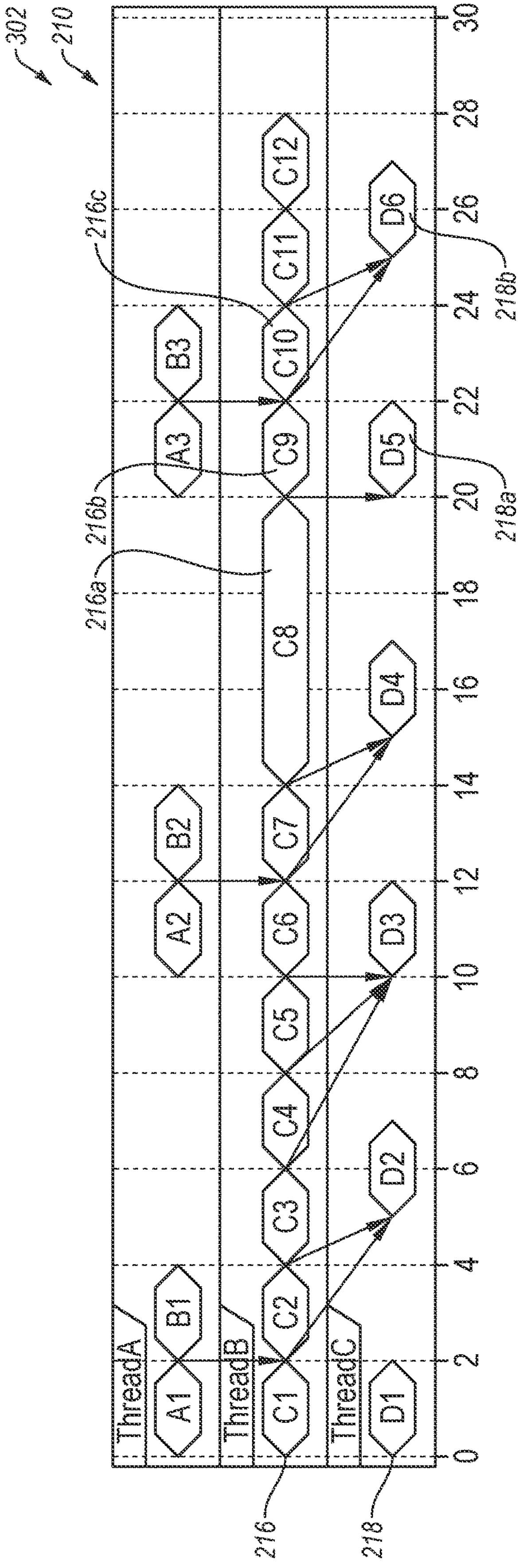

For example, FIG. 2B illustrates an example data flow 210 illustrating an instance of a data flow that may be affected by a delayed execution iteration of task, in accordance with traditional approaches to multiple task execution. The data flow 210 may illustrate a first task 216 with a first execution period of 2 ms and a first execution time of 2 ms. For instance, a first execution iteration 216*a* of the first task 216 may be configured and/or expected to start processing at time 14 ms and complete by 16 ms, a second execution iteration 216*b* may be expected to start at 16 ms and complete by 18 ms and a third execution iteration 216*c* may start at 18 ms and complete by 20 ms. In some instances, a first execution iteration 218*a* of a second task 218 may be configured to start processing at 20 ms. In these instances, the first execution iteration 218*a* of the second task 218 may be expected to, based at least on expected start and completion times, obtain and process a first data iteration, a second data iteration, and a third data iteration corresponding to the first execution iteration 216*a*, the second execution iteration 216*b*, and the third execution iteration 216*c* of the first task 216, respectively.

In some instances, one or more execution iterations may be delayed. For example, the first execution iteration 216*a* of the first task 216 may be delayed such that actual execution time is 8 ms compared to the first execution time of 2 ms. For instance, the first execution iteration 216*a* of the first task 216 may start at 14 ms and end at 20 ms. In these instances, the first execution iteration 218*a* of the second task 218, which is defined to start at 20 ms may only obtain the first data iteration corresponding to the first execution iteration 216*a* of the first task, as the second execution iteration 216*b* of the first task 216 and the third execution iteration 216*c* of the first task 216 have not completed executing at 20 ms.

Returning to FIG. 1, in some embodiments, the completion times included in the timestamps may represent predetermined completion times (corresponding to execution period and execution time) instead of actual execution times. For example, the timestamp corresponding to the first execution iteration of the Task A 114*a* may include an expected completion time of the first execution iteration. For example, the Task A 114*a* may have a first iteration time of 2 ms, indicating that the first execution iteration is to start at 0 ms and complete at 2 ms. In these instances, regardless of actual completion time of the first execution iteration, the timestamp may include 2 ms as the completion time, even in instances the first execution iteration may take longer to complete (e.g., 3 ms). In some embodiments, a task obtaining the first execution iteration of the Task A 114*a* may determine, from the corresponding timestamp, that the first execution iteration of the Task A 114*a* is supposed to complete by 2 ms. For example, the Task C 124 may determine from the timestamp that the first execution iteration of the Task A 114*a* is supposed to complete by 2 ms even if corresponding first data iteration may not be in the memory 105. In these instances, the Task C 124 may stall and/or wait until the first execution iteration of the Task A 114 completes and the corresponding first data iteration becomes available.

Figure 2C:
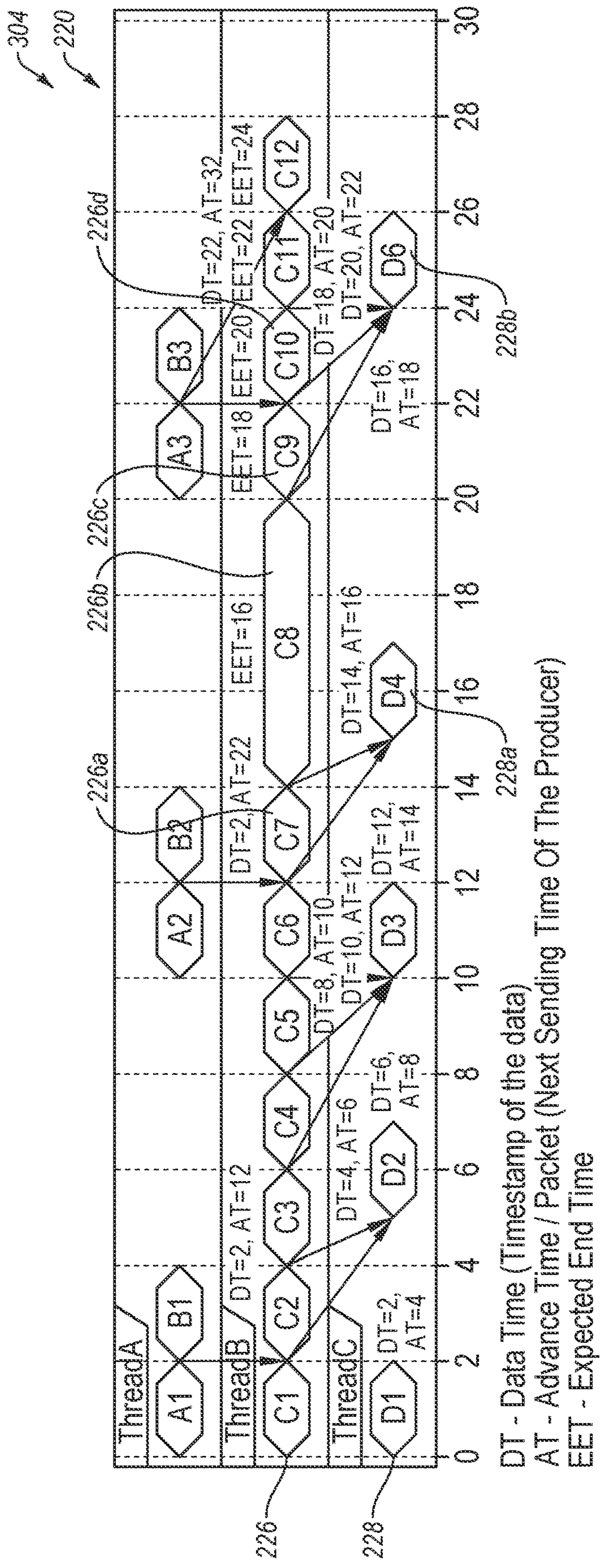

For example, FIG. 2C illustrates an example data flow 220 illustrating an instance of stalled execution. In some embodiments, the data flow 220 may include a first task 226 including a first execution iteration 226*a*, a second execution iteration 226*b*, a third execution iteration 226*c*, and a fourth execution iteration 226*d*. In some embodiments, the first task 226 may be executed based at least on a first execution period and a first execution time. For example, with the first execution period of 2 ms and the first execution time of 2 ms, the first task may be expected to start an execution iteration every 2 ms for 2 ms at a time. For instance, the first execution iteration 226*a* of the first task 226 may start at 12 ms and end by 14 ms. The second execution iteration 226*b* of the first task 226 may start at 14 ms and end by 16 ms and further repeated in 2 ms increments.

In some embodiments, the data flow 220 may further illustrate a second task 228 including a first execution iteration 228*a* of the second task 228 and a second execution iteration 228*b* of the second task 228. In some embodiments, the second task 228 may be executed based at least on a second execution period and a second execution time. For example, the second execution period may include 5 ms and the second execution time may be 2 ms. For instance, the first execution iteration 228*a* of the second task 228 may be executed at 15 ms and the second execution iteration 228*b* of the second task 228 may be expected to execute at 20 ms. In these and other embodiments, the first execution iteration 328*a* of the second task 228 may be configured to obtain (e.g., a computing platform executing the second task 228 may obtain) at least a first data iteration corresponding to the first execution iteration 226*a* of the first task 226 which completes executing at 14 ms.

In these and other embodiments, the second execution iteration 228*b* of the second task 228 may be configured to obtain the data iterations corresponding to the second execution iteration 226*b* of the first task 226, the third execution iteration 226*c* of the first task 226, and the fourth execution iteration 226*d* of the first task 226 which are expected to complete by 16 ms, 18 ms, and 20 ms, respectively.

In some instances, an execution iteration may be delayed. For example, the second execution iteration 226*b* of the first task 226 may take 6 ms to complete instead of 2 ms. For instance, the second execution iteration 226*b* of the first task 226 may start at 14 ms and complete at 20 ms. In these instances, the second execution iteration 228*b* of the second task 228 may execute without obtaining the expected data iterations of the first task 226 as the second execution iteration 228*b* of the second task 228 is expected to start at 20 ms. For example, the second execution iteration 228*b* of the second task 228 may not obtain the data iterations corresponding to the third execution iteration 226*c* of the first task 226 and the fourth execution iteration 226*d* of the first task 226 which may complete at 22 ms and 24 ms, respectively.

Such variance from expected data flow may add randomness to the data flow 220. According to one or more embodiments of the present disclosure, to compensate for the delay and the added randomness, the second computing platform may be configured to wait for the third execution iteration 226*c* and the fourth execution iteration 226*d* of the first task 226 to complete before executing the second execution iteration 228*b* of the second task 228. For instance, the second computing platform may obtain timestamps corresponding to execution iterations of the first task 226 to determine which of the execution iterations of the first task 226 were expected to complete by starting time of the second execution iteration 228*b* of the second task 228. For example, a timestamp corresponding to the second execution iteration 226*b* of the first task 226 may indicate a completion time of 16 ms (regardless of actual completion time of 20 ms) and 18 ms as expected completion time of next iteration. A timestamp corresponding to the third execution iteration 226*c* of the first task 226 may indicate a completion time of 18 ms (regardless of actual completion time of 22 ms) and 20 ms as expected completion time of next iteration. A timestamp corresponding to the fourth execution iteration 226*d* of the first task 226 may indicate a completion time of 20 ms (regardless of actual completion time of 24 ms) and 22 ms as expected completion time of next iteration.

In these instances, the second computing platform may determine, based at least on the timestamps, that by the start time of the second execution iteration 228*b* of the second task 228 (e.g., 20 ms), the first task 226 is supposed to have executed up to the fourth execution iteration 226*d* of the first task 226. In these instances, the second computing platform may stall and/or delay executing the second execution iteration 228*b* of the second task 228 until the first task 226 is actually executed up to the fourth execution iteration 226*d* (e.g., until 24 ms).

Retuning to FIG. 1, in some embodiments, the system 100 may be configured to permit data flows and/or tasks to flow and/or process to include variances caused by hardware and/or software issues. For instance, a particular set of tasks may be executed for one or more iterations. In some instances, certain iterations of the tasks may be delayed and/or take longer to complete. In some embodiments, the system 100 may allow the tasks to be executed without compensating for the delay. For example, the timestamps may not be modified as illustrated in FIGS. 3B-3C. In these and other embodiments, start times and end times of different iterations of the tasks may be recorded. For example, the recorded times may represent actual execution times of the tasks. In some embodiments, the recorded times may be used to reproduce the data flow.

Figure 2D:
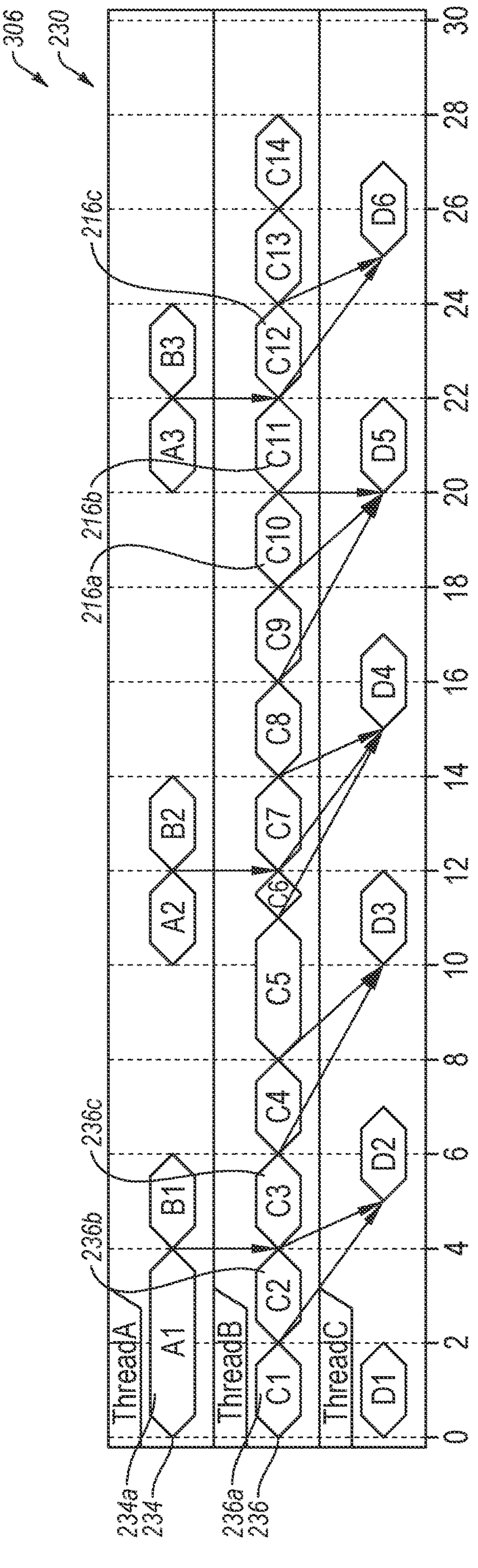

For example, FIG. 2D illustrates an example data flow 230 representing timings of execution iteration of different tasks. In some instances, the data flow 230 may represent a data flow of system without restrictions and/or stalling of execution iterations. For instance, the data flow 230 may illustrate execution timings of a first task 234 which may be executed by a first computing platform, and a second task 236 executed by a second computing platform. In some embodiments, the first task 234 and the second task 236 may be iterated for one or more execution iterations. In some instances, the tasks may be related such that the second task 236 may obtain data from the first task 234. In some instances, the data flow 230 may represent execution timings of the tasks associated with a system such as a vehicle. For instance, the tasks may represent different sets of operations that may be performed by the system.

In some instances, the execution iterations of different tasks may be executed based at least on execution periods and execution times. For example, the first task 234 may be executed and/or iterated every first execution period (e.g., 10 ms), and individual iteration may be expected to complete in a first execution time (e.g., 2 ms). The second task 236 may be executed and/or iterated every second execution period (e.g., 2 ms), and individual iteration may be expected to complete in a second execution time (e.g., 2 ms).

In some instances, a first execution iteration 234*a* of the first task 234 may take longer to complete. For example, the first execution iteration 234*a* of the first task 234 may take 4 ms to complete instead of expected execution time of 2 ms.

In such instances, the first task 234 may be executed without purposely stalling different tasks to compensate for the delay with the first execution iteration 234*a* of the first task 234. For instance, without the delay, a second execution iteration 236*b* of the second task 236 may have obtained and processed a first data iteration corresponding to the first execution iteration 234*a* of the first task 234. However, the delay may cause a third execution iteration 236*c* of the second task 236 may obtain and process the first data iteration corresponding to the first execution iteration 234*a* of the first task 234.

According to one or more embodiments of the present disclosure, instead of stalling execution iterations to conform to predetermined relationships between the tasks (e.g., the second execution iteration 236*b* of the second task 236 obtaining the first data iteration corresponding to the first execution iteration 234*a* of the first task 234), actual start and end times of the one or more iterations of the tasks may be recorded. In some embodiments, the recorded times may be used to determine timestamps that may be used to reproduce the data flow 230. For example, the timestamps may be modified based at least on the recorded times to reproduce the data flow 230 as actually executed.

Figure 2E:
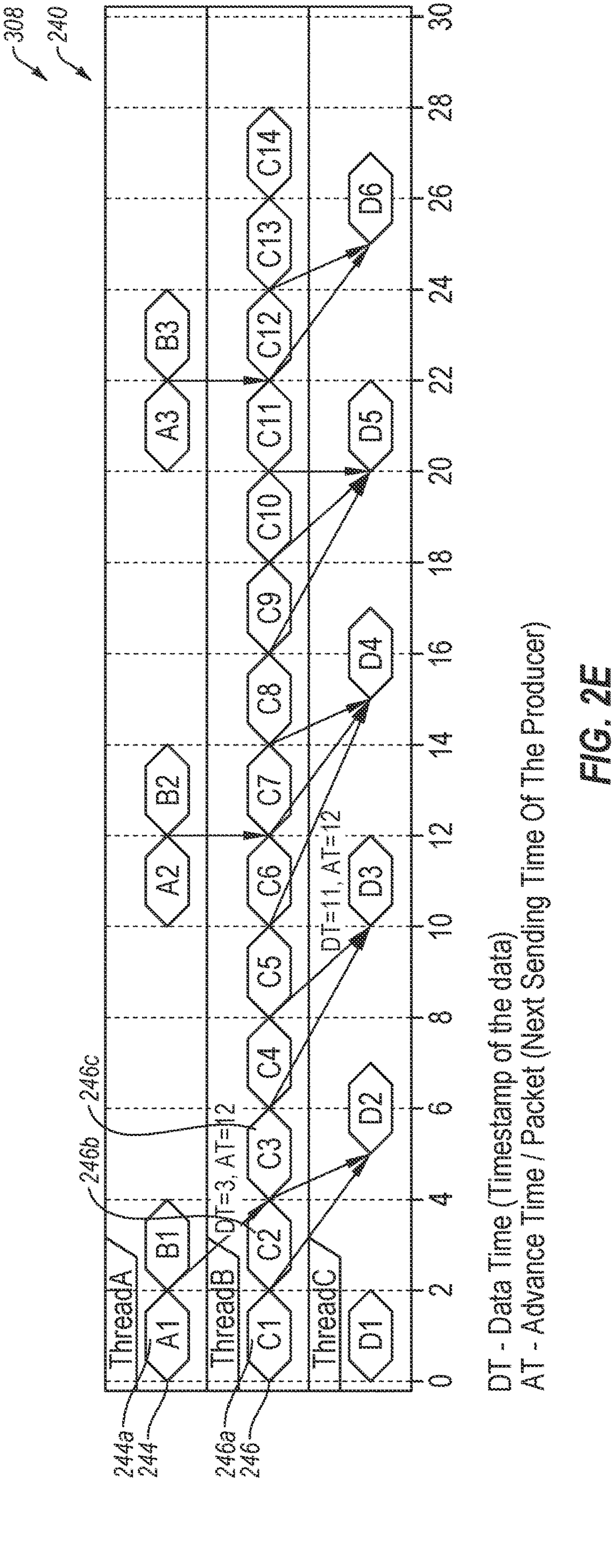

For example, FIG. 2E illustrates a data flow 240 representing a data flow reproducing the data flow 230 of FIG. 2D. In some instances, the data flow 240 may include a first task 244 and a second task 246 which may correspond to the first task 234 and the second task 236 of FIG. 2D, respectively. In some instances, one or more timestamps associated with different iterations of the first task 244 and/or the second task 246 may be modified such that the data flow 230 of FIG. 2D may be reproduced.

For example, a timestamp associated with a first execution iteration 244*a* of the first task 244 may be modified such that data iteration generated by through the first execution iteration 244*a* of the first task 244 may be obtained and/or processed by a third execution iteration 246*c* of the second task 246, regardless of actual execution time of the first execution iteration 244*a* of the first task 244. For instance, the timestamp may define a completion time of the first execution iteration 244*a* of the first task 244 as 3 ms, although actual completion time may be 2 ms. By defining the completion time as 3 ms, the third execution iteration 246*c* (with a start time of 4 ms) of the second task 246 may obtain and/or process the data generated by the first execution iteration 244*a* of the first task 244 over a first execution iteration 246*a* (with a start time of 0 ms) or a second execution iteration 246*b* (with a start time of 2 ms) of the second task 246.

Returning to FIG. 1, in some embodiments, in addition to or alternative to the recorded times, the system 100 and/or the computing platforms executing the tasks may record metadata associated with one or more execution iterations of the tasks. The metadata may include information and/or attributes associated with the one or more execution iterations of the tasks. The information and/or the attributes may provide details related to the execution iterations of the tasks. For example, the metadata may include a packet ID (e.g., unique label or identifier assigned to individual data packets or data iterations) and consumed data iterations (e.g., data iterations from other tasks obtained and/or processed by the execution iterations of the tasks).

In some embodiments, the metadata may be used to compensate for variances that may occur due to time that may take to send and receive data between the tasks. For instance, the recorded start times and end times may not correspond to the send/receive times due to time taken to transmit data. By using the metadata, the data flow may be reproduced while compensating for the transmittal times. For instance, the timestamps may be modified and/or adjusted to compensate for the transmittal times.

Modifications, additions, or omissions may be made to FIG. 1 without departing from the scope of the present disclosure. For example, the system 100 may include more or fewer elements than those illustrated and described in the present disclosure.

Figure 3:
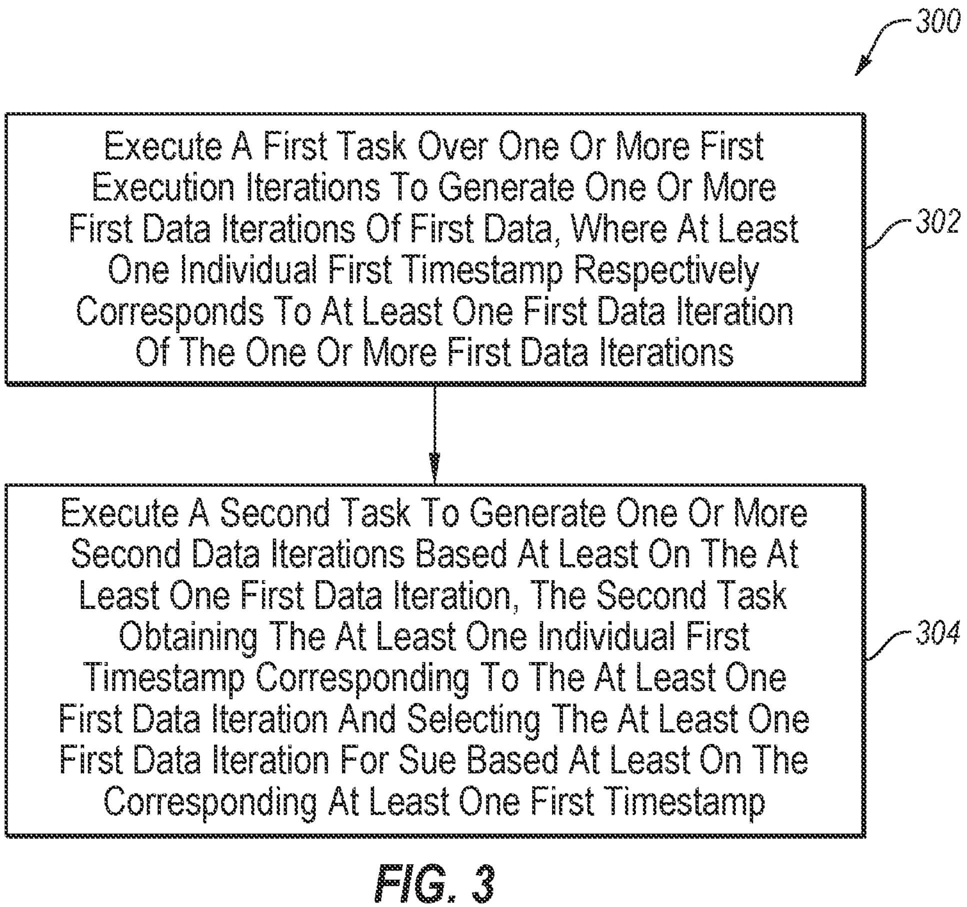
FIG. 3 illustrates an example flow diagram illustrating a method for executing multiple tasks, in accordance with one or more embodiments of the present disclosure.

FIG. 3 is a flow diagram illustrating a method 300 for executing multiple tasks, in accordance with one or more embodiments of the present disclosure. In some embodiments, one or more operations of the method 300 may be performed with respect to the system 100 of FIG. 1. One or more operations of the method 300 may be performed by any suitable system, apparatus, or device such as, for example, the system 100, the autonomous vehicle system(s) described with respect to FIGS. 4A-4D, computing device(s) described with respect to FIG. 5, and/or the data system(s) described with respect to FIG. 6 in the present disclosure.

The method 300 may include one or more blocks. Although illustrated with discrete blocks, the operations associated with one or more of the blocks of the method 300 may be divided into additional blocks, combined into fewer blocks, or eliminated, depending on the particular implementation. The method 300 may include a block 302.

At block 302, a first task may be executed over one or more first execution iterations to generate one or more first data iterations. In some embodiments, at least one individual first timestamp may respectively correspond to at least one first data iteration of the one or more first data iterations.

In some embodiments, the at least one individual first timestamp may correspond to a first clock corresponding to the first task. For instance, the first clock may be configured to measure and/or determine different times associated with the first task to generate the timestamps.

In some embodiments, the timestamps may represent completion times of individual data iterations corresponding to the timestamps. For instance, the timestamps may represent times individual execution iterations, which generated the individual data iterations, completed executing. For instance, the first clock may measure different times the individual execution iterations complete executing to generate the timestamps.

In some embodiments, the timestamps may represent expected completion times of the one or more first execution iterations compared to actual completion times of the one or more first execution iterations. For instance, in some embodiments, the one or more first execution iterations may be configured to begin executing every first execution period and to complete within a first execution time. In some instances, one or more of the first execution iterations may be delayed and/or take longer to complete than the first execution time due to several internal and/or external factors. In some embodiments, the timestamps may represent the expected completion times aligned with the first execution period and the first execution time rather than the actual completion times.

Additionally or alternatively, the timestamps corresponding to the first data iterations may represent expected completion times of the first execution iterations following the first execution iterations corresponding to the first data iterations. For instance, a first individual execution iteration of the first task may be expected to complete at time 1, and a second individual execution iteration of the first task may be expected to complete at time 2. In these instances, a timestamp corresponding to the first individual execution iteration and/or a data iteration corresponding to the first individual execution iteration may represent the time 2. In some instances, the time 2 may replace the time 1 for the timestamp corresponding to the first individual execution iteration. In other instances, the first data iterations may be associated with multiple timestamps. For example, the timestamp corresponding to the first individual execution iteration may have a first timestamp including the time 1 and a second timestamp including the time 2.

At block 304, a second task may be executed to generate one or more second data iterations based at least on the at least one first data iteration. For instance, in some embodiments, the second task may be configured to perform one or more second execution iterations to further process the first data iterations. In some embodiments, the second task may obtain the at least one individual first timestamp corresponding to the at least one first data iteration and select the at least one first data iteration for use based at least on the corresponding at least one first timestamp.

For instance, the second task may observe the completions times of the first execution iterations corresponding to the first data iterations to determine which of and/or how many of the first data iterations to obtain and process for individual second execution iterations of the second task. In some instances that the timestamps represent actual completion times of the first execution iterations, the individual second execution iterations may obtain and/or process the first execution iterations that completed prior to or by the time that the individual second execution iterations begin executing. In some embodiments a time associated with the second task may be measured and/or kept track of using a second clock. In some embodiments, the second clock may be operated independently from the first clock. For instance, the first clock and the second clock may not perfectly match.

In some instances in which the timestamps represent expected completion times of the first execution iterations, the individual second execution iterations may obtain and/or process the first execution iterations that are expected to complete prior to or by the time that the individual second execution iterations begin executing. For instance, the second task may observe the expected completion times of the first execution iterations to determine which of the first data iterations are expected to be available for further processing by the second task at different individual second execution iterations. In some instances, the second task may determine that certain first data iterations that are expected to be available at a certain time are not available (e.g., corresponding first execution iterations have not completed). In some embodiments, the second task may be stalled and/or be delayed until the certain first data iterations are available (e.g., corresponding first execution iterations complete processing) to begin executing the individual second execution iterations.

Additionally or alternatively, in instances with the timestamps representing the expected completion times of subsequent and/or following execution iterations, the second task may observe the timestamps to determine whether to stall the individual second execution iterations. For instance, the second task may confirm and/or gain confidence that an individual second execution iteration may begin executing by determining that the second task has obtained expected first data iterations. For instance, the second task may observe that a subsequent first data iteration expected to complete after start time of the individual second execution iteration, indicating that the subsequent first data iteration is expected by be obtained and/or processed by a subsequent individual second execution iteration. The second task may determine that the second task may begin processing without waiting further. In some instances, the second task may determine, based on the timestamps, that the subsequent first data iteration is expected to be processed by a certain individual second execution iteration. For instance, the expected completion time associated with the subsequent first data iteration may indicate that the subsequent first data iteration should be available for the certain individual second execution iteration, even if the subsequent first data iteration is not yet available. In such instances, the second task may stall executing the certain individual second execution iteration until the subsequent first data iteration is available.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 4A:
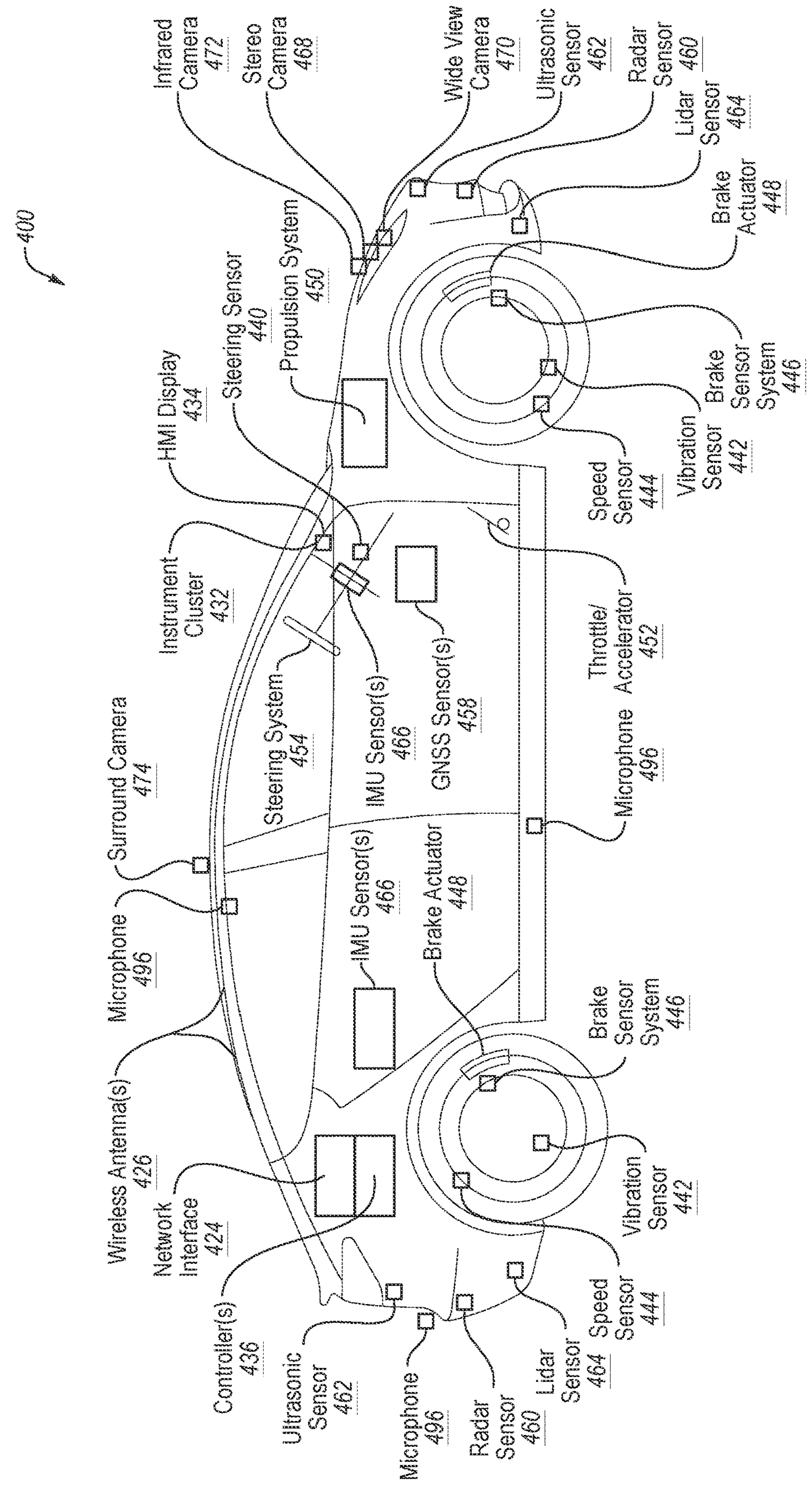
FIG. 4A is an illustration of an example autonomous vehicle, in accordance with one or more embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
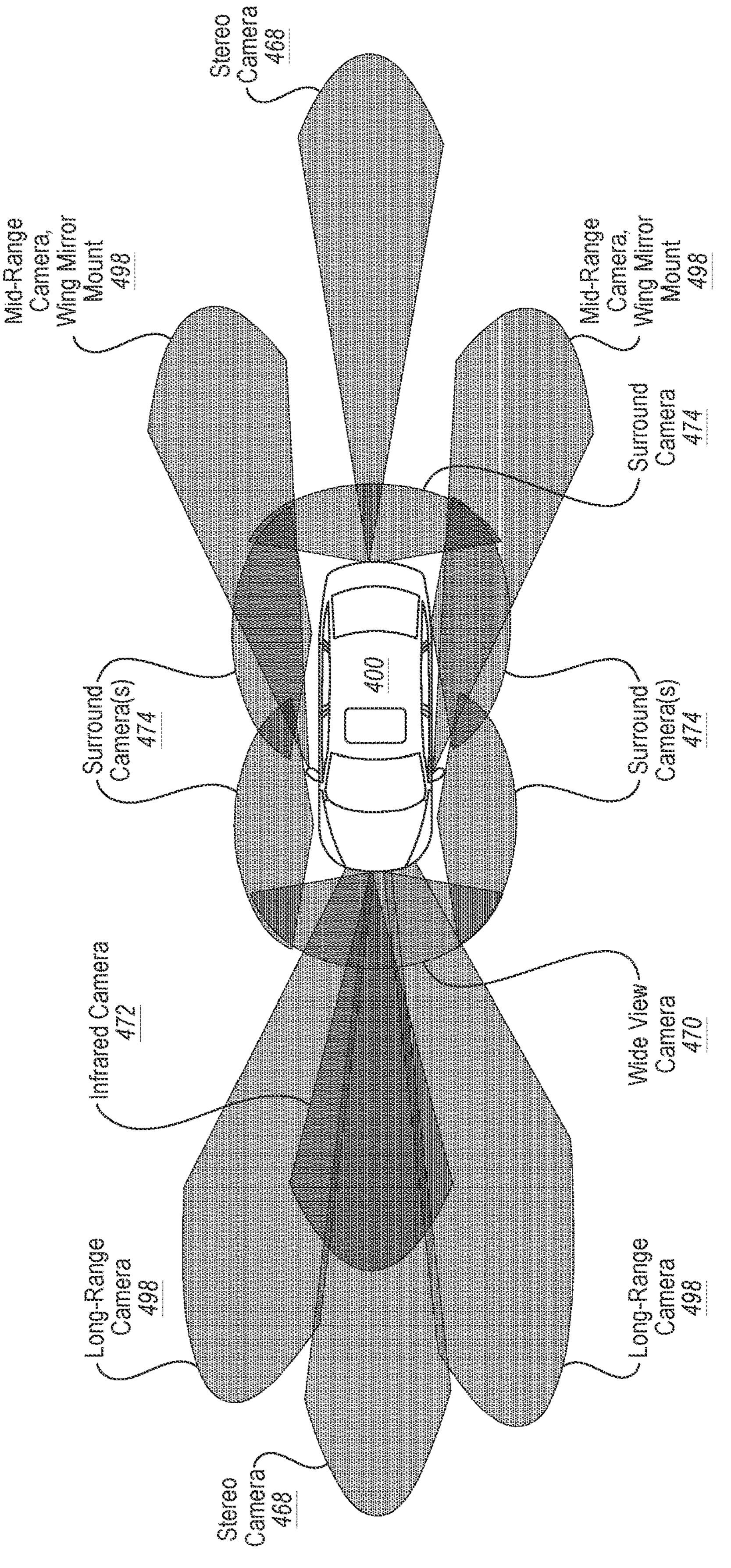
FIG. 4B is an example of camera locations and fields of view for the example autonomous vehicle of FIG. 4A, in accordance with one or more embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red, blue, green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may be any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
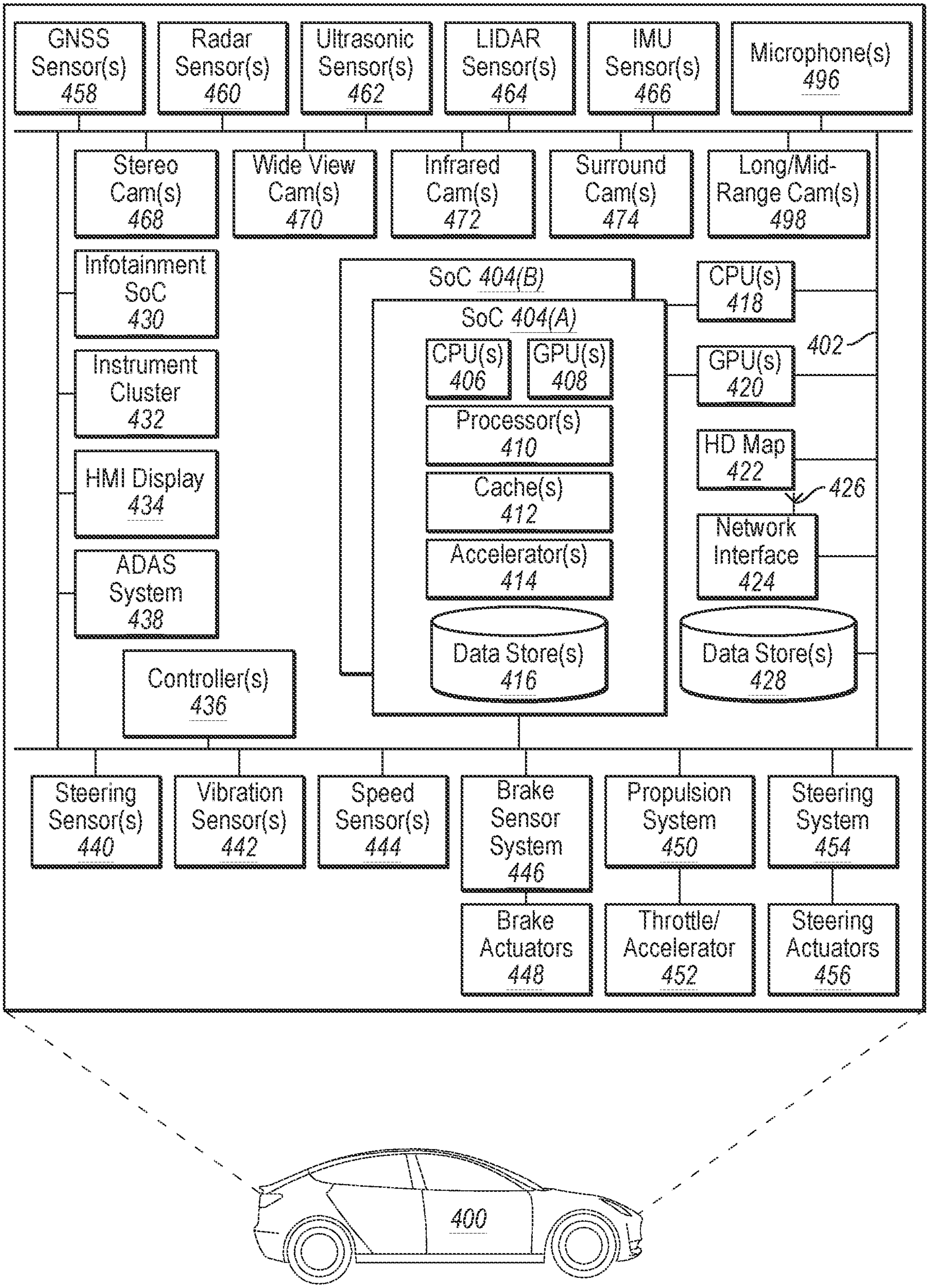
FIG. 4C is a block diagram of an example system architecture for the example autonomous vehicle of FIG. 4A, in accordance with one or more embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such as the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 404 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term “CNN,” as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPD (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surrounding at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources.

Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
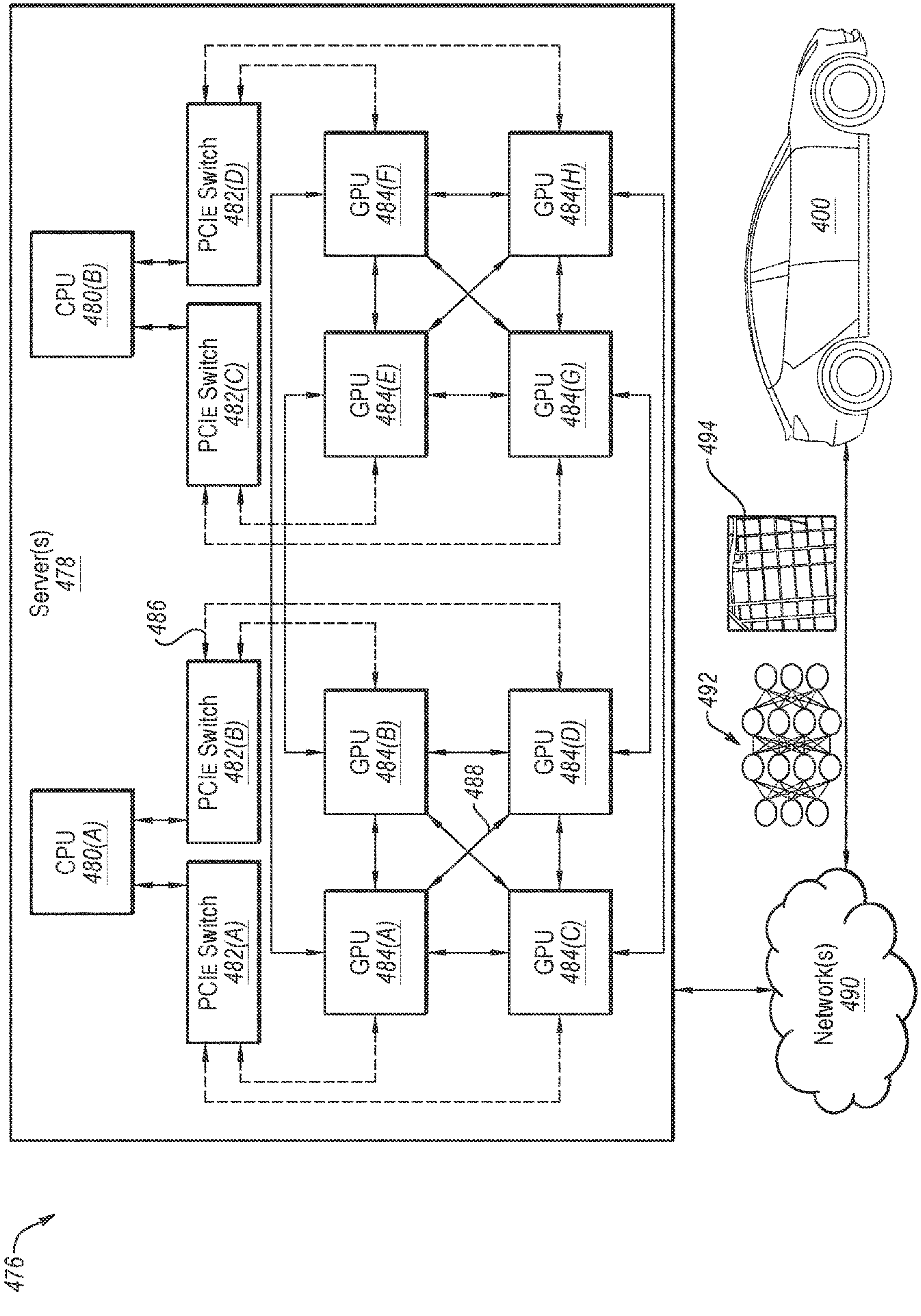
FIG. 4D is a system diagram for communication between cloud-based server(s) and the example autonomous vehicle of FIG. 4A, in accordance with one or more embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
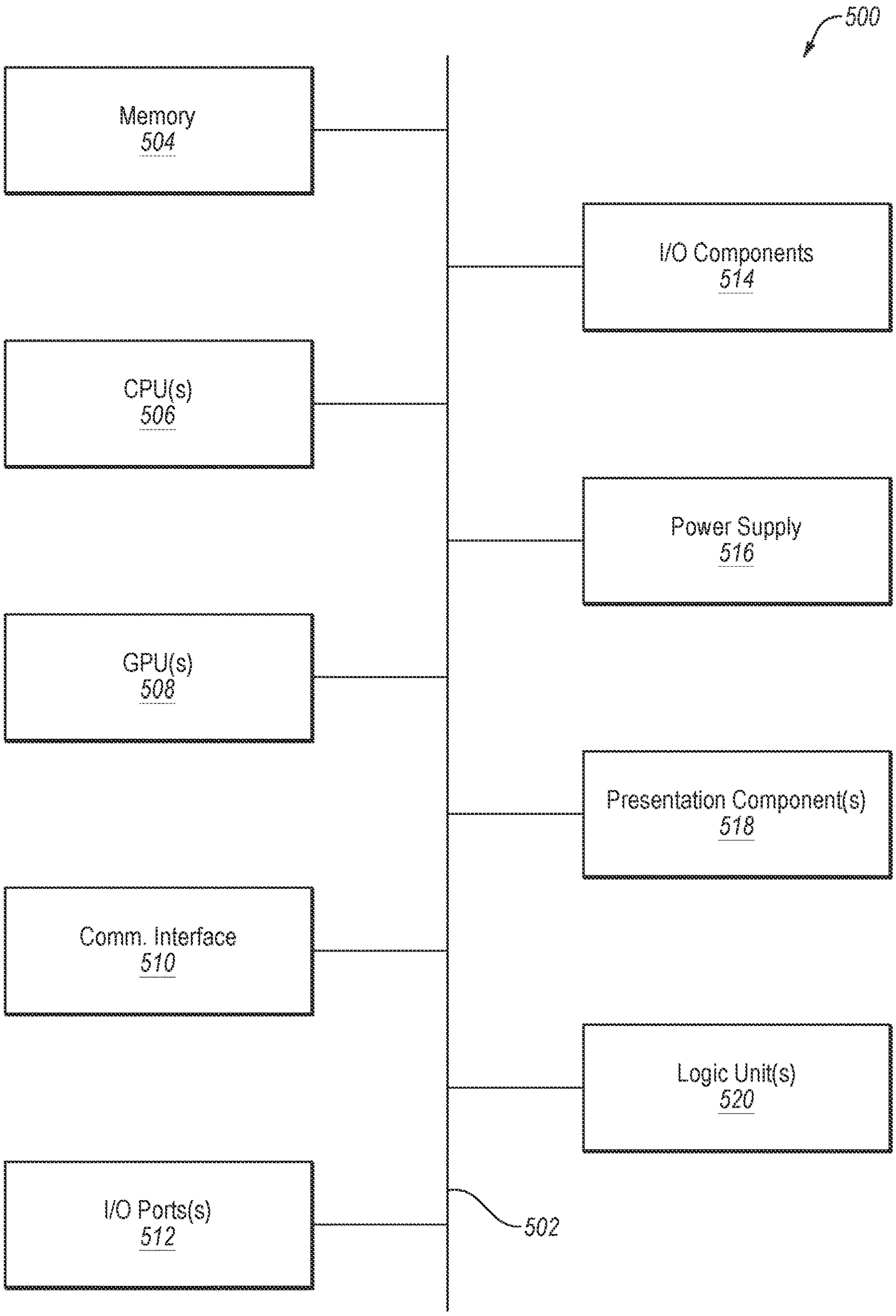
FIG. 5 is a block diagram of an example computing device suitable for use in implementing one or more embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, include wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

Example Data Center

Figure 6:
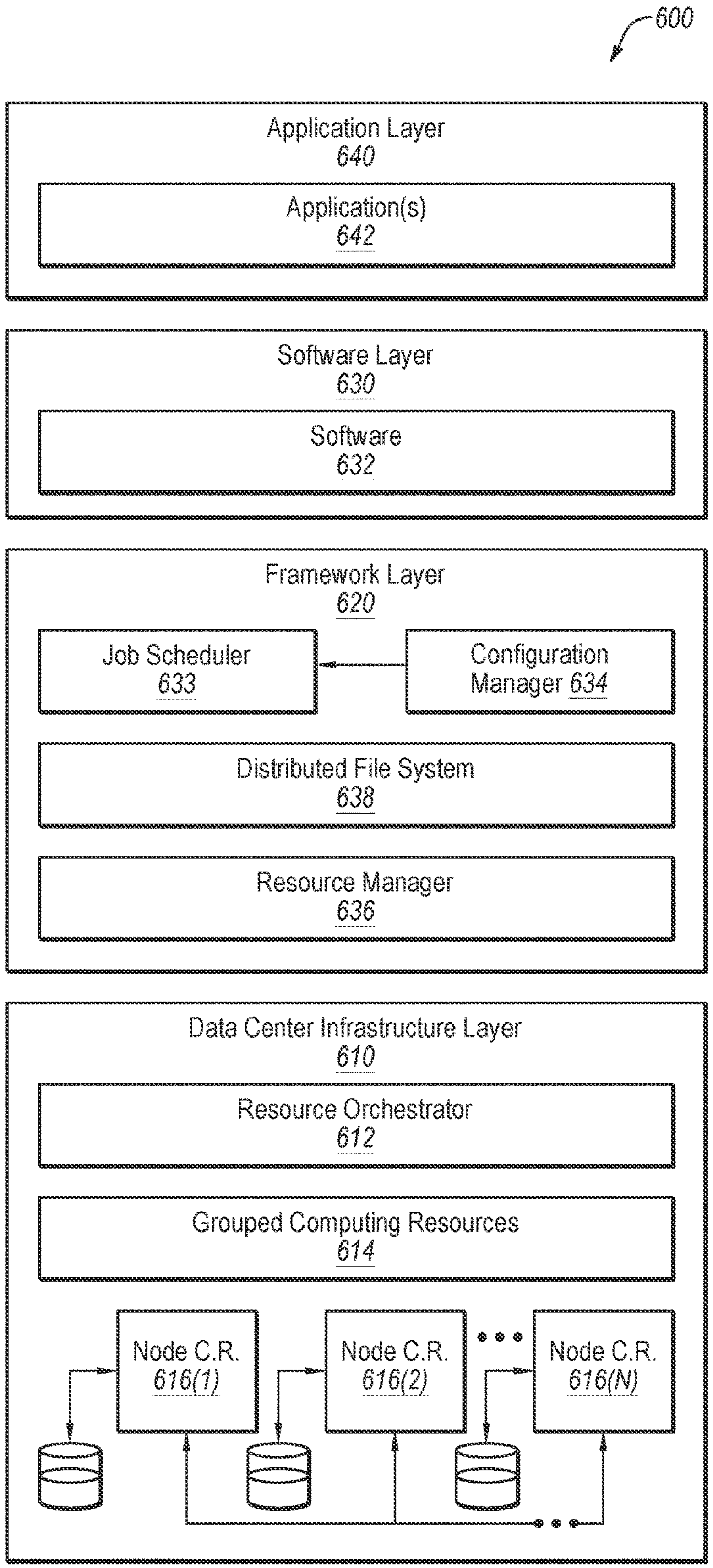
FIG. 6 is a block diagram of an example data center suitable for use in implementing one or more embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to perform operations comprising:

executing a first task over one or more first execution iterations to generate one or more first data iterations of first data, wherein at least one individual first timestamp respectively corresponds to at least one first data iteration of the one or more first data iterations; and executing a second task to generate one or more second data iterations based at least on the at least one first data iteration, the second task obtaining the at least one individual first timestamp corresponding to the at least one first data iteration and selecting the at least one first data iteration for use based at least on the corresponding at least one first timestamp.

2. The system of claim 1, wherein the at least one individual first timestamp corresponds to a first clock corresponding to the first task.

3. The system of claim 1, wherein a second clock corresponding to the second task keeps track of a second time of the second task.

4. The system of claim 3, wherein the second task selects the at least one first data iteration for use based at least on the corresponding at least one first timestamp being less than or equal to the second time of the second task.

5. The system of claim 1, wherein the first task is executed on a first computing platform and the second task is executed on a second computing platform.

6. The system of claim 5, wherein the first computing platform and the second computing platform are different.

7. The system of claim 1, wherein the at least one individual first timestamp corresponding to the at least one first data iteration represents a completion time of an individual execution iteration of the one or more first execution iterations corresponding to the first data iterations of the one or more first data iterations.

8. The system of claim 1, wherein the at least one individual first timestamp corresponding to the at least one first data iteration represents an expected completion time of an execution iteration of the one or more first execution iterations corresponding to a data iteration following the at least one first data iteration.

9. The system of claim 1, wherein the at least one individual first timestamp corresponding to the at least one first data iteration represents an expected completion time of an individual execution iteration of the one or more first execution iterations corresponding to the at least one first data iteration of the one or more first data iterations.

10. The system of claim 9, wherein execution of the second task is stalled based at least on the expected completion time of the individual execution iteration of the one or more first execution iterations.

11. The system of claim 1, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system for presenting at least one of augmented reality content, virtual reality content, or mixed reality content;

a system for hosting one or more real-time streaming applications;

a system implemented using an edge device;

a system implemented using a robot;

a system for performing one or more conversational AI operations;

a system implementing one or more large language models (LLMs);

a system for performing one or more generative AI operations;

a system for generating synthetic data;

a system incorporating one or more virtual machines (VMs);

a system implemented at least partially in a data center; or a system implemented at least partially using cloud computing resources.

12. A method comprising:

executing a first task over one or more first execution iterations to generate one or more first data iterations of first data, wherein at least one individual first timestamp respectively corresponds to at least one first data iteration of the one or more first data iterations, the at least one individual first timestamp corresponding to a first clock corresponding to the first task; and executing a second task to generate one or more second data iterations based at least on the at least one first data iteration, the second task obtaining the at least one individual first timestamp corresponding to the at least one first data iteration and selecting the at least one first data iteration for use based at least on the corresponding at least one first timestamp by comparing the at least one individual first timestamp to a second time associated with the second task, a second clock corresponding to the second task keeping track of the second time.

13. The method of claim 12, wherein the second task selects the at least one first data iteration for use based at least on the corresponding at least one first timestamp being less than or equal to the second time of the second task.

14. The method of claim 12, wherein the first task is executed on a first computing platform and the second task is executed on a second computing platform.

15. The method of claim 14, wherein the first computing platform and the second computing platform are different.

16. The method of claim 12, wherein the at least one individual first timestamp corresponding to the at least one first data iteration represents a completion time of an individual execution iteration of the one or more first execution iterations corresponding to the first data iterations of the one or more first data iterations.

17. The method of claim 12, wherein the at least one individual first timestamp corresponding to the at least one first data iteration represents an expected completion time of an execution iteration of the one or more first execution iterations corresponding to a data iteration following the at least one first data iteration.

18. The method of claim 12, wherein the at least one individual first timestamp is determined based at least on an initial run of the one or more first execution iterations of the first task, the at least one individual first timestamp representing a time the at least one first data iteration corresponding to the at least one individual first timestamp was generated.

19. The method of claim 18, wherein the at least one individual first timestamp is modified based at least on metadata associated with the at least one first data iteration.

20. A system comprising:

a memory;

a first computing platform configured to execute a first task over one or more first execution iterations to generate one or more first data iterations of the first task, the first computing platform storing the one or more first data iterations on the memory, wherein one or more timestamps correspond to the one or more first data iterations; and a second computing platform configured to execute a second task over one or more second execution iterations to generate one or more second data iterations of the second task to be stored in the memory, the second computing platform executing the second task based at least on one or more of the first data iterations obtained from the memory, wherein the second computing platform determines individual first data iterations to obtain based at least on the one or more timestamps corresponding to the one or more first data iterations.

* * * * *